United States Patent [19]

Hartmann

[11] Patent Number: 4,764,851
[45] Date of Patent: Aug. 16, 1988

[54] LIGHT FIXTURE

[75] Inventor: Richard Hartmann, Holland, Mich.

[73] Assignee: ITC, Incorporated, Zeeland, Mich.

[21] Appl. No.: 13,538

[22] Filed: Feb. 11, 1987

[51] Int. Cl.⁴ .............................................. B60Q 3/00
[52] U.S. Cl. ...................................... 362/74; 362/238; 362/251; 362/367
[58] Field of Search ............... 362/238, 235, 236, 237, 362/251, 367, 362, 801, 74, 61, 62, 240, 249, 368, 375

[56] References Cited

U.S. PATENT DOCUMENTS

| | | | |
|---|---|---|---|
| 2,587,807 | 3/1952 | Arenberg et al. | 362/74 |
| 3,218,446 | 11/1965 | Langer . | |
| 3,238,654 | 3/1966 | Rosenak et al. . | |
| 3,471,959 | 10/1969 | Seeger . | |
| 4,096,379 | 6/1978 | Taylor | 362/235 |
| 4,142,227 | 2/1979 | Aikens | 362/74 |
| 4,225,909 | 9/1980 | Scholz et al. . | |
| 4,302,800 | 11/1981 | Pelletier . | |
| 4,340,929 | 7/1982 | Konikoff . | |
| 4,499,528 | 2/1985 | Hawlitzki | 362/74 |
| 4,532,579 | 7/1985 | Merryman | 362/367 |

FOREIGN PATENT DOCUMENTS

| | | | |
|---|---|---|---|
| 1361058 | 4/1964 | France | 362/235 |
| 0050169 | 4/1979 | Japan | 362/237 |

OTHER PUBLICATIONS

Product Brochure of R. V. Supply, Inc., Elkhart, Indiana–date of publication unkown.

*Primary Examiner*—Ira S. Lazarus
*Assistant Examiner*—D. M. Cox
*Attorney, Agent, or Firm*—Price, Heneveld, Cooper, DeWitt & Litton

[57] ABSTRACT

A dual light source lighting fixture is made up of two identical single light source fixtures, the housings of which are identical. Each housing has one square end and each is symmetrical about an axis normal to the square end so that the single housing can be assembled into a double housing in an end to end relationship simply by removing an end cover, locking the housings together by use of a connector and covering the joint with a snap-on cover.

8 Claims, 2 Drawing Sheets

LIGHT FIXTURE

FIELD OF THE INVENTION

This invention relates to lighting fixtures and particularly to lighting fixtures specifically designed for use in recreational vehicles.

BACKGROUND OF THE INVENTION

Numerous illumination fixtures have been designed for use in recreational vehicles. Because of the compactness of such vehicles and the fact that they are subject to motion, these fixtures are normally small and compact and are designed with a low silhouette so that they do not project any substantial distance from the surface on which they are mounted. It has been the custom in the manufacture of these lighting fixtures to make them either with a single illumination source or with a dual illumination source. The housing and bodies for such fixtures have been specifically designed for each of these types of fixtures. The housing of most of these fixtures have been so designed that different and non-interchangeable tools have been necessary for each of the two types. This has not only complicated inventory but has also been a source of frustration at the point of use when there is an inventory shortage of the particular type needed at that point in the vehicle's manufacturing cycle. This has resulted in higher costs and increased application of labor.

BRIEF DESCRIPTION OF THE INVENTION

The invention provides a design for a lighting fixture such that the identical housing can be used either for a single or a dual illumination source fixture with both fixtures having the appearance of having been specifically designed for the type of fixture that it is. This is important because the fixtures are part of the decorative or ornamental appearance of the interior of the recreational vehicles and, therefore, a fixture which does not appear to be a complete entity or one that appears to have been adapted to a different use than that for which it was specifically designed is not acceptable. Accordingly, a fixture housing for a dual fixture is not acceptable in a situation in which only one of the sources is utilized. This invention makes it possible, either at the point of manufacture or at the point of installation and use, to change a single fixture into a dual fixture by very simple conversion means utilizing a minimum of components. Thus, both the manufacturer and the user need only maintain an inventory of a single type of fixture, since the conversion from single to dual can be made at the point of installation quickly, easily, without either special tools or special instructions. This arrangement allows the manufacturing costs to be reduced because only a single housing design is needed and the productive capacity of the tooling for that design can be more fully utilized. Warehousing and similar functions desirable to maintain an adequate inventory are simplified. The components utilized to convert the fixture from single to dual use require no special tools and can be performed within a matter of minutes.

DESCRIPTION OF THE PREFERRED EMBODIMENT

Figure 1:
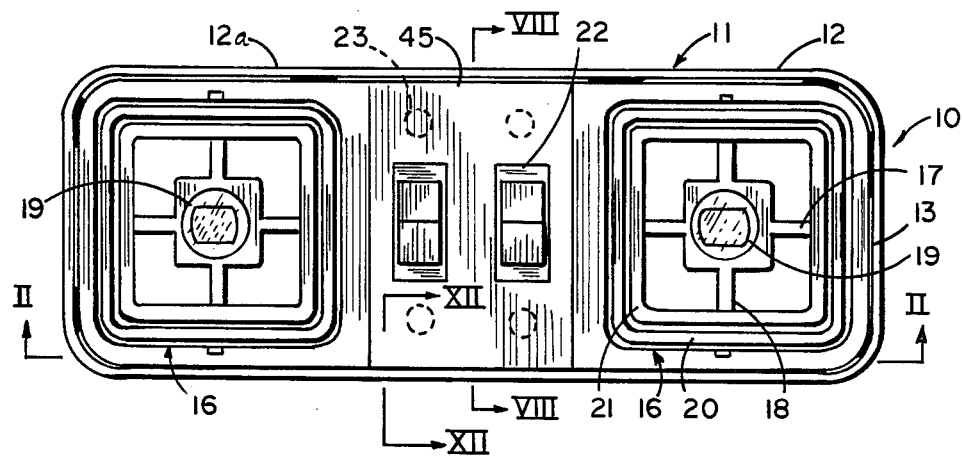
FIG. 1 is a front view of a fixture incorporating this invention.
Figure 8:
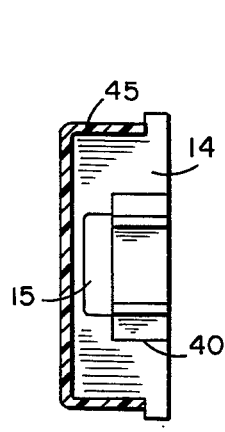
FIG. 8 is a sectional, elevation view taken along the plane VIII—VIII of FIG. 1.

FIG. 1 illustrates a dual lamp 10 incorporating this invention, which lamp has a housing 11 consisting of first and second jackets 12 and 12a. The jackets 12 and 12a are identical, the jacket 12a being merely the jacket 12 turned end for end. The jackets can be manufactured as a metal casting or stamping or molded of plastic capable of withstanding the heat incident to the operation of the light. The jackets 12 and 12a each have an outer rim element 13 extending along one end and both sides. The housings are preferably tapered upwardly toward one end and at that end are partially closed by a panel 14 (FIG. 8). The panel has a central aperture 15 which extends to the back edge of the panel. Each of the housings has an enlarged, generally square opening 16 toward one end. Mounted in the opening, by means of gimbles 17 and 18, is a light source 19. The gimbles make it possible to adjust the position of the light so that it will be directed toward the desired target. The use of gimbles of this design, including their inner frames 20 and 21, is well-known in the lighting art and does not constitute any part of this invention. Adjacent the end having the panel 14, a switch 22 is secured to the housing by any suitable means. The switch controls the light in the particular housing to which it is mounted. Thus, it will be understood that in the completed fixture created by the practice of this invention, there are two of the openings 16, each of which is equipped with a pair of the gimbles and a light source 19. There is also a pair of switches 22, one for each of the light sources.

Figure 3:
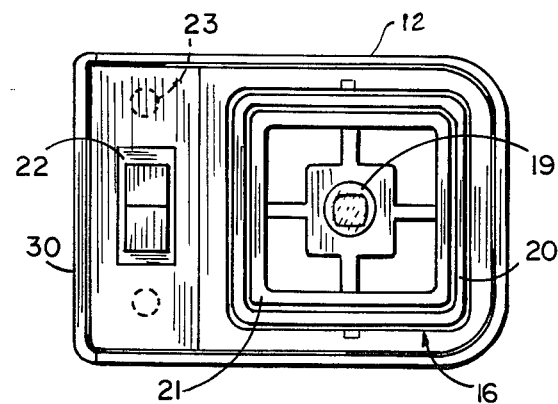
FIG. 3 is a view similar to FIG. 1 illustrating a single light source fixture utilizing this invention.
Figure 5:
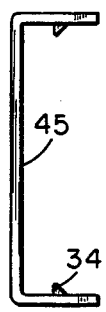
FIG. 5 is an end view of the cap illustrated in FIG. 4.
Figure 10:
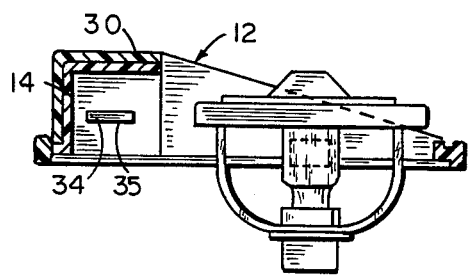
FIG. 10 is a side elevation view of a single housing for this invention taken along the same plane as FIG. 2, omitting the switch.
Figure 11:
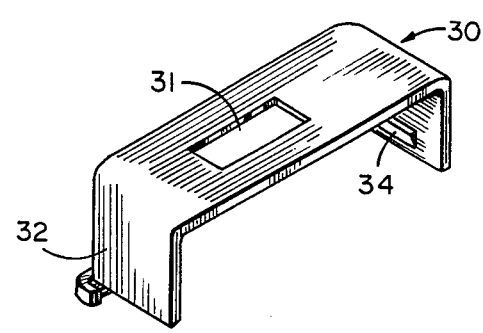
FIG. 11 is an oblique view of the end cap for the fixture when used as a single illumination source.

An individual housing 11, before being assembled with a like one into the fixture illustrated in FIG. 1, is illustrated in FIGS. 3 and 11. It will be observed that the area where the switch 22 is located is a generally rectangular compartment enclosed by a end cap 30 which has an opening 31 for the handle of the switch 22, a pair of sides 32 and an end panel 33 (FIGS. 10 and 11). It also has a pair of inwardly extending, wedge-shaped fingers 34, one on the inside face of each of the sides 32. The fingers 34 have an inside face inclined inwardly toward the front, creating a lip which serves as a latch when it seats in the opening 35 in the side walls of housing 11. Thus, it can be assembled to the housing simply by being passed from the front rearwardly over the switch until the fingers 34 snap into the openings 35. This is easily done and provides an effective connection. This arrangement requires either the end cap or the jacket to which it is attached to have a degree of resilience. If the jacket is a metal casting, the end cap can be molded plastic or a metal stamping. If the jacket itself is either a molded plastic part or a metal stamping, it will provide the necessary resilience. The end cap closes the end of the single fixture housing and provides it with an attractive finished appearance. The end cap 30 is a discard when single fixtures are converted into dual fixtures. When the end cap is removed, the panel 15 forms the end face of the housing.

Figure 2:
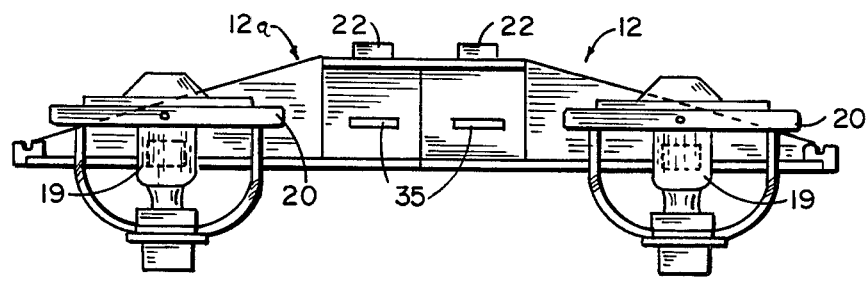
FIG. 2 is a sectional elevation view taken along the plane II—II of FIG. 1.
Figure 4:
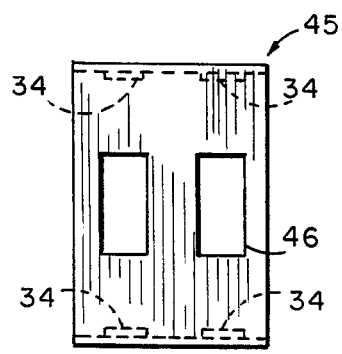
FIG. 4 is a front view of the cap utilized at the housing joint of the dual fixture.
Figure 6:
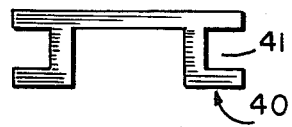
FIG. 6 is a bottom view of the connector used to assemble the housings into the dual fixture.
Figure 7:
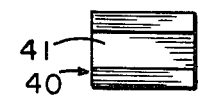
FIG. 7 is an end view of the connector illustrated in FIG. 6.
Figure 9:
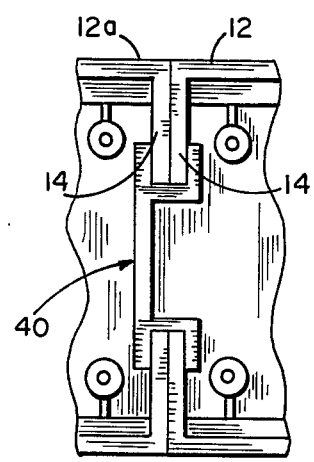
FIG. 9 is a fragmentary, rear view of the joint between the two housings.
Figure 12:
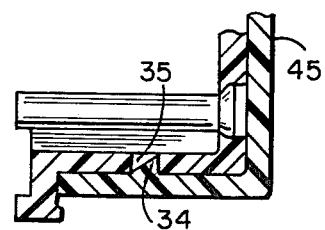
FIG. 12 is an enlarged fragmentary sectional view taken along the plane XII—XII of FIG. 1.

To create the dual light fixture illustrated in FIGS. 1 and 2, a pair of the single fixtures, as illustrated in FIGS. 3 and 10 are selected and their end caps 30 are removed. The fixtures are then abutted end to end and an anchor sleeve 40 is installed in the aligned openings provided in the now abutting walls 14 of the two fixtures (FIG. 9). The anchor sleeve at each has a channel 41 of a width to firmly embrace the two panels 14 (FIG. 6) so that when the anchor sleeve is fully inserted into the openings 15 it locks the panels 14 together, thus, assembling the two housings. The housings are further connected and the joint concealed by installation of the U-shaped cover panel 45 (FIG. 3) which is snapped over the joint between the two housings and is provided with four of the latch fingers 34 to engage in the four openings 34 left by reason of the removal of the end caps 30. Dual switch openings 46 are provided for the switches which have remained in place during the modification. This completes the assembly of the dual fixture making it ready for installation. The anchor sleeve 40 can be a metal casting or a molded plastic part. The cover panel 45 can be a molded plastic part or a metal stamping if it has to provide the resilience necessary for assembly. If the jackets have the necessary resilience, the cover panel can be a metal casting. If the housing of the fixture is plastic, it can be molded from plastics which can withstand the temperatures inherent in their use as light sources. An example of a material meeting this requirement is acrylonitrile butadiene styrene (ABS). This material, while providing the rigidity necessary for fixture stability also has enough resilience to permit a snap together type of assembly as is necessary for assembly and removal of the end cap 30 and assembly of the cover panel 45.

Because of the ease with which the single units can be converted into double units, it is only necessary for the manufacturer to ship the single units together with conversion kits because the conversion from single to double can be made in a matter of minutes at the point of installation. This has obvious benefits both from the standpoint of inventory and from the standpoint of maintaining an adequate supply of both types of fixtures at the point of installation. The invention also eliminates the necessity for a second mold to make the large body and increases the utilization of the mold for the single body. These are both matters which materially reduce costs and manufacturing complexity.

Having described a preferred embodiment of the invention, it will be understood that various modifications of the embodiment can be made without departing from the principles of the invention. Such modifications are to be considered as included in the hereinafter appended claims unless these claims by their language expressly state otherwise.

I claim:

1. A frame for a lighting fixture, said frame having a body forming a jacket of generally rectangular shape adapted to support a source of illumination, one end of said body forming a compartment of generally rectangular cross-section, one face of said body being in a single plane and serving as a base to be seated against a supporting surface, a wall at the end of said compartment forming the end of said body, said wall being perpendicular to the lengthwise axis of said body; a second body identical to said first body and having an end wall, said first and second bodies being arranged with their exterior surfaces in alignment lengthwise of said fixture and the wall of said second body being in abutment with the wall of said first body; connector means engaging said walls and clamping said walls together with the jackets of said first and second bodies seated against each other in aligned relationship to form a lighting fixture frame symmetrical about the plane of abutment of said bodies.

2. A frame for a lighting fixture, said frame having a body forming a jacket of generally rectangular shape adapted to support a source of illumination, one end of said body forming a compartment of generally rectangular cross-section, one face of said body being in a single plane and serving as a base to be seated against a supporting surface, a wall at the end of said compartment forming the end of said body, said wall being perpendicular to the lengthwise axis of said body; a second body identical to said first body, a wall of said second body being in abutment with the wall of said first body and connector means engaging said walls and holding said walls together to form a lighting fixture frame symmetrical about the plane of abutment of said bodies; a generally U-shaped jacket is seated over the abutting portions of said bodies, means securing said U-shaped jacket to both of said bodies.

3. A lighting fixture as described in claim 2 wherein said jacket overlies all of the compartments of both bodies.

4. A lighting fixture as described in claim 1 wherein said walls have aligned apertures extending through the edges of said walls at said one face; said connector being slidably seated in said openings.

5. A lighting fixture, said fixture having a first body member of rectangular shape, a source of illumination mounted in said body extending through the outer face of said body and offset toward one end and a switch compartment adjacent the other end; the opposite face of said body being in a single plane and serving as a base to be seated against a supporting surface; a wall at the end of said switch compartment remote from said illumination source, said wall having an opening extending from said base toward said outer face, a second body identical to said first body, the other end of said second body being in abutment with the other end of said first body and connector means seated in the openings of the adjacent walls holding said walls together to form a lighting fixture having dual illumination sources and symmetrical about the plane of abutment of said bodies.

6. A lighting fixture as described in claim 5 wherein a generally U-shaped jacket is provided, said jacket being of a size and shape to slidably seat over both of said switch compartments, means for detachably securing said jacket to both of said bodies.

7. A lighting fixture as described in claim 6 wherein a switch is mounted in the switch compartment of each of said bodies, said jacket having a pair of openings therein, one for each of said switches.

8. A lighting fixture as described in claim 5 wherein said connector has a pair of U-shaped end elements and a web connecting said elements, said end elements each forming a channel of a width to receive said walls and resiliently clamp them together.

* * * * *

UNITED STATES PATENT AND TRADEMARK OFFICE
CERTIFICATE OF CORRECTION

PATENT NO. : 4,764,851

DATED : August 16, 1988

INVENTOR(S) : Richard Hartmann

It is certified that error appears in the above-identified patent and that said Letters Patent is hereby corrected as shown below:

Column 4, line 35:
"Claim 1" should be --Claim 2--.

Signed and Sealed this

Twenty-ninth Day of August, 1989

Attest:

DONALD J. QUIGG

*Attesting Officer*  *Commissioner of Patents and Trademarks*